United States Patent [19]

Bozzelli et al.

[11] 4,112,049

[45] Sep. 5, 1978

[54] ABSORPTION OF SULFUR COMPOUNDS FROM GAS STREAMS

[75] Inventors: John W. Bozzelli; George D. Shier, both of Midland, Mich.; Roscoe L. Pearce; Charles W. Martin, both of Lake Jackson, Tex.

[73] Assignee: The Dow Chemical Company, Midland, Mich.

[21] Appl. No.: 778,904

[22] Filed: Mar. 18, 1977

[51] Int. Cl.$^2$ ............................................ B01D 53/34
[52] U.S. Cl. .................................. 423/226; 423/228; 423/243
[58] Field of Search ............... 423/226, 228, 230, 242, 423/243; 260/268 MK; 55/68, 73

[56] References Cited

U.S. PATENT DOCUMENTS 2,649,450    8/1973    Strong et al. ................. 260/268 MK

FOREIGN PATENT DOCUMENTS 450,519    7/1936    United Kingdom .................... 423/228

*Primary Examiner*—Earl C. Thomas
*Attorney, Agent, or Firm*—G. R. Baker; D. H. Thurston

[57] ABSTRACT

Hydrogen sulfide and lower alkyl mercaptans are selectively extracted from a gas stream by contacting the stream with piperazinone or an alkyl substituted piperazinone which may contain a substantial proportion of water. The absorbed sulfur compounds can be regenerated by heating the extraction liquid to about 85°–150° C.

6 Claims, No Drawings

ABSORPTION OF SULFUR COMPOUNDS FROM GAS STREAMS

BACKGROUND OF THE INVENTION

This invention relates to a method for selectively removing $H_2S$ and lower alkyl mercaptans from gaseous streams. More particularly, it relates to a method whereby these sulfur compounds are selectively removed by contacting the gas stream with a liquid piperazinone compound.

Gas streams consisting largely of methane, other lower aliphatic hydrocarbons, hydrogen, and other gases such as natural gas, refinery gases, and coal gasification product streams typically contain acidic contaminants such as $H_2S$, lower alkyl mercaptans, other sulfur compounds, and $CO_2$. It is desirable to separate the $H_2S$ and any mercaptans that may be present while leaving the $CO_2$ largely in the gas stream so as to obtain a stream of high $H_2S$ content for efficient sulfur recovery in a Claus plant or other such sulfur recovery process. Known sour gas purification solvents include ethanolamine, N-methyldiethanolamine, diethanolamine, triethanolamine, isopropanolamine, diisopropanolamine, sulfolane, N-methyl-3-morpholinone, their aqueous solutions, and mixtures of these. While these are effective absorbents for $H_2S$, they typically show only kinetic selectivity. Substantial quantities of $CO_2$ will also be absorbed when it is present.

SUMMARY OF THE INVENTION

It has now been found that the sulfur compounds $H_2S$ and lower alkyl mercaptans in particular are selectively absorbed from a gaseous feed stream in the presence of $CO_2$ when the gaseous feed stream is contacted with a liquid piperazinone compound of the formula

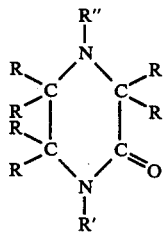

wherein each R, R', and R" is independently a hydrogen atom or a lower alkyl group. The piperazinone compound can be used in anhydrous or essentially anhydrous state or it may be combined with water to about 45 percent piperazinone concentration. The liquid piperazinone compound absorption medium thus contacted with the gaseous feed stream forms a mixture rich in $H_2S$ and mercaptans if present and these sulfur compounds are efficiently and essentially completely desorbed by heating the absorption medium to about 85° C.–150° C. The absorption step can be carried out at any convenient temperature below about 60° C. where the absorption medium remains liquid. Preferably, the absorption is done at about 15° C.–50° C.

DETAILED DESCRIPTION OF THE INVENTION

Piperazinone compounds of the invention can be prepared by any of several known methods, see particularly Strong et al., U.S. Pat. Nos. 2,649,450 and 2,700,668.

1,4-Dialkylpiperazinones, and particularly 1,4-dimethylpiperazinone, are preferred. The term "lower alkyl" in the above general formula is defined as meaning alkyl of 1–5 carbon atoms such as methyl, ethyl, isopropyl, tert-butyl, and tert-amyl. Other preferred piperazinones include 3-methylpiperazinone, 4-ethylpiperazinone, 3,3,4-trimethylpiperazinone, 1-ethyl-4-methylpiperazinone, and 1-tert-butyl-4-methylpiperazinone.

The piperazinone absorption medium may contain up to about 55 percent of water. Best results are obtained when less than an equal weight of water is present, for example, from about 75 percent aqueous piperazinone to the anhydrous or nearly anhydrous material. Since these piperazinones are hygroscopic and most gas streams of the kind treated by this process normally contain more or less water vapor, in practice, there is almost always some water present in the absorption medium as the absorption process proceeds even when the medium is initially essentially anhydrous.

The class of piperazinone compounds described herein effectively promote the hydrolysis of carbon oxysulfide to $H_2S$ and $CO_2$ in the presence of water as set forth in application Ser. No. 778,903 of J. W. Bozzelli, D. M. Bremer, and G. D. Shier filed concurrently herewith, the disclosure of which is hereby incorporated by reference. Therefore, the $H_2S$ absorption and the COS hydrolysis can be combined in a single contacting step. Alternatively, a COS-containing gas can be contacted with a liquid aqueous piperazinone compound in a first stage as described in the above application or with another COS-hydrolyzing solution to hydrolyze at least the major part of the COS and absorb at least some of the $H_2S$ and mercaptans present, then the gas purification process is completed in a second stage using a piperazinone absorption medium as described herein.

The absorption process may be run at or slightly above atmospheric pressure and in some cases, it may be advantageous to employ superatmospheric pressure as high as 10,000 psi to increase the rate or amount of absorption. The time of contact during the absorption step can vary from about a few seconds up to about 1 hour.

Regeneration of the absorbed sulfur compounds is readily accomplished by heating the enriched solvent to 85° C. or above, preferably to 100° C.–150° C. Moderately reduced pressure can be applied to accelerate the desorption to some extent although this is usually not necessary. The piperazinone absorption solvent is further characterized by its ready release of nearly all of the absorbed sulfur compounds upon heating, 90 percent or more of the absorbed $H_2S$ and mercaptans being thus desorbed in a relatively short time as compared to known alkanolamine absorbents.

Further advantages of the piperazinone compound absorption media of this invention in addition to those noted above include a desirable low viscosity and high degrees of chemical and thermal stability. Its unique selectivity for $H_2S$ in the presence of $CO_2$ is of particular interest. Whereas some known sour gas purification solvents show some selectivity toward $H_2S$ when both $H_2S$ and $CO_2$ are present, these piperazinone compound media exhibit nearly complete equilibrium $H_2S$ selectively over $CO_2$ at atmospheric and superatmospheric pressure.

EXAMPLE 1

The absorption of $H_2S$ and $CO_2$ in different alkaline solvents was estimated by atomizing a known amount of a solvent into a suction flask filled with $H_2S$ or $CO_2$ at atmospheric pressure and following the pressure reduction in the flask by means of an automatic pressure recorder. Measurements were made at 22° C. The pressure reading at 2 minutes after injection of the solvent was used to estimate the quantity of gas absorbed. This is a qualitative test useful for rough screening. Since the results are obtained at reduced pressure, these results are low as compared to those found in practical gas scrubbing where superatmospheric pressure is the usual condition. The results of these tests are listed in Table I.

TABLE I

| Solvent | Gas Injected | g. Gas Absorbed per 100 g. Solvent |
|---|---|---|
| 45% NNDP[1] 55% $H_2O$ | $H_2S$ | trace |
| 100% NNDP[1] | $H_2S$ | 4.6 |
| 50% 3-(dimethyl-amino)-1,2-propanediol 50% $H_2O$ | $H_2S$ | 8.0 |
| 50% MDEA[2] 50% $H_2O$ | $H_2S$ | 5.3 |
| 45% NNDP[1] 55% $H_2O$ | $CO_2$ | no absorption |
| 90% NNDP[1] 10% $H_2O$ | $CO_2$ | no absorption |
| 50% 3-(dimethyl-amino)-1,2-propanediol 50% $H_2O$ | $CO_2$ | 3.9 |
| 50% MDEA[2] 50% $H_2O$ | $CO_2$ | 1.4 |

Terms:
[1]NNDP = 1,4-dimethylpiperazinone
[2]MDEA = N-methyldiethanolamine

EXAMPLE 2

The efficiency with which absorbed $H_2S$ can be liberated from a solvent was measured by first saturating a 50 g sample by bubbling $H_2S$ through a 19 gauge needle immersed in the solvent for 2 hours, then stripping off the $H_2S$ from the saturated solvent by heating it to 105° C. as fast as possible. A magnetic stirbar was used for agitation. The heating was done using the same equipment and procedure in each case. Results are listed in Table II.

TABLE II

| Solvent | Wt. % $H_2S$[2] in Saturated Solvent | Wt. % $H_2S$[2] in Solvent after Regeneration | Time to 105° C, min. |
|---|---|---|---|
| 95% NNDP 5% $H_2O$ | 3.63 | 0.38 | 7 |
| 30% MEA[1] 70% $H_2O$ | 13.71 | 2.61 | 16 |
| 50% MDEA 50% $H_2O$ | 8.15 | 1.81 | 12 |

[1]MEA = monoethanolamine
[2]Based on the amine content

We claim:

1. A process for removing sulfur compounds of the group $H_2S$ and lower alkyl mercaptans from a gaseous stream which comprises contacting said stream with a liquid piperazinone compound of the formula

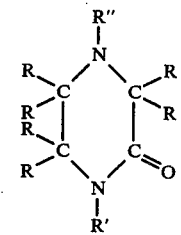

wherein each R, R', and R'' is independently a hydrogen atom or a lower alkyl group, thereby forming a mixture of said piperazinone rich in $H_2S$ and alkyl mercaptans.

2. The process of claim 1 wherein the absorbed $H_2S$ and mercaptans are desorbed by heating the enriched piperazinone compound to about 85° C.–150° C.

3. The process of claim 1 wherein the piperazinone compound is 1,4-dimethylpiperazinone.

4. The process of claim 1 wherein the liquid piperazinone compound is present as its aqueous solution in about 45 to 99 percent concentration.

5. The process of claim 4 wherein the gaseous feed stream is contacted with the aqueous piperazinone compound at a temperature of about 15° C.–60° C.

6. The process of claim 4 wherein the gaseous feed stream is contacted with the aqueous piperazinone compound under superatmospheric pressure.

* * * * *